United States Patent Office 3,084,173
Patented Apr. 2, 1963

3,084,173
ETHINYL AND VINYL DERIVATIVES OF 19-NOR-ANDROSTAN-3β,17β-DIOL
Howard J. Ringold, Albert Bowers, and George Rosenkranz, all of Mexico City, Mexico, assignors, by mesne assignments, to Syntex Corporation, a corporation of Panama
No Drawing. Filed Apr. 10, 1958, Ser. No. 727,522
Claims priority, application Mexico Apr. 11, 1957
5 Claims. (Cl. 260—397.4)

The present invention relates to novel cyclopentanophenanthrene derivatives and to a process for the production thereof.

More particularly the present invention relates to the novel 19-nor-androstan-3β,17β-diol and C–17 lower alkyl, ethinyl and vinyl derivatives thereof as well as the corresponding esters, to a novel process for the production of these compounds and to certain novel intermediates. The novel final products of the present invention i.e. 19-nor-androstan-3β,17β-diol, the 17α-lower alkyl derivatives, 17α-vinyl derivatives, 17α-ethinyl derivatives and the esters of these compounds are all hormones of the androgenic type having a relatively high anabolic-androgenic ratio as well as a pronounced anti-estrogenic effect. They are therefore valuable for the shrinkage of mammary glands, for the building of dihabilitated tissue and for other well known anti-estrogenic and anabolic effects, since they also produce a minimum of androgenic action.

In U.S. Patent No. 2,756,244, granted July 24, 1956, there is disclosed and claimed the androgenic type hormone 19-nor-androstan-17β-ol-3-one which as pointed out in this patent possesses a favorable anabolic-androgenic ratio. In accordance with the present invention it has been discovered that treatment of this compound with an alkali metal double hydride reducing agent such as lithium aluminum hydride or sodium borohydride reduces the 3-keto group to a 3β-hydroxy group to give the novel 19-nor-androstan-3β,17β-diol which possesses a much more favorable anabolic-androgenic ratio than the starting 3-ketone. Further the diol is a much more desirable anti-estrogenic agent and possesses a lesser androgenic effect than the 3-ketone. It has further been discovered in accordance with the present invention that 17α-lower alkyl, 17α-vinyl and 17α-ethinyl derivatives of 19-nor-testosterone on treatment with an alkali metal such as lithium in liquid ammonia give the corresponding intermediate androstane derivatives and these androstane derivatives on reduction with the hydride reducing agents hereinbefore mentioned give the corresponding novel 17α-lower alkyl, 17α-vinyl and 17α-ethinyl-androstan-3β,17β-diols. These 17α-substituted diols are also valuable androgenic type hormones of highly favorable anabolic-androgenic ratio and desirable anti-estrogenic agents. The same value properties are also exhibited by the esters of androstan-3β,17β-diol and its 17α-lower alkyl, 17α-vinyl, 17α-ethinyl derivatives hereinafter set forth in detail. Further the novel intermediate 17α-vinyl-androstan-17β-ol-3-one is also an androgenic type hormone having a high anabolic-androgenic ratio and anti-estrogenic value.

The novel compounds of the present invention may therefore be illustrated by the following formulas:

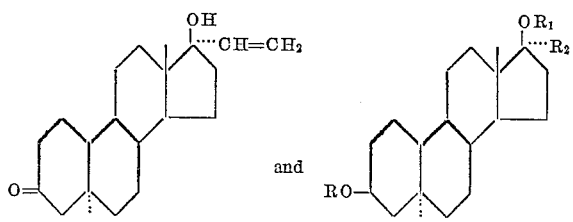

In the above formula R represents hydrogen or an acyl group of the type conventionally known in the steroid art. These acyl groups are those derived from hydrocarbon carboxylic acids having up to 12 carbon atoms such as acetate, propionate, benzoate, caproate, undecenoate, and cyclopentylpropionate. $R_2$ represents hydrogen, a lower alkyl group of less than 7 carbon atoms such as methyl, ethyl or propyl, vinyl or ethinyl. $R_1$ is the same as R when $R_2$ is hydrogen and $R_1$ represents hydrogen when $R_2$ is lower alkyl, vinyl or ethinyl.

The novel compounds set forth above are produced by a process illustrated by the following equation:

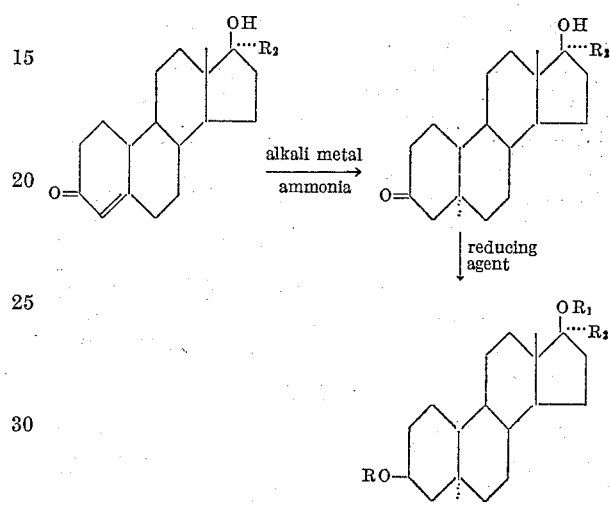

In the above equation R, $R_1$ and $R_2$ represent the same groups as heretofore set forth.

In practicing the invention above outlined 19-nor-testosterone or its 17-alkyl, vinyl or ethinyl derivative in an inert organic solvent such as dioxane or ether or a mixture of dioxane and ether is added to a solution of an alkali metal such as lithium in liquid ammonia. After the hydrogenation is completed the ammonia is allowed to evaporate and the product conventionally purified to give the corresponding saturated allo (androstane) derivative. For the second step above outlined the androstane compound is dissolved in an inert organic solvent and treated at room temperature with a hydride reducing agent such as sodium borohydride or lithium aluminum hydride and then conventionally purified.

Treatment of 19-nor-androstan-3β,17β-diol thus produced with conventional esterifying agents such as an acid anhydride or chloride of a hydrocarbon carboxylic acid of up to 12 carbon atoms in pyridine for example gave the corresponding 3,17-diacylates. As may be understood these acylates may be derived from acids which may be saturated or unsaturated, straight or branched chain, cyclic or cyclicaliphatic and may be substituted as known in the art with for example halogen groups. The same conventional esterification of the 17α-alkyl, vinyl or ethinyl compounds gave the 3-mono-acylates.

The following specific examples serve to illustrate but are not intended to limit the present invention.

*Example I*

A solution of 15 g. of 17α-ethinyl-19-nor-testosterone in a mixture of 120 cc. of dioxane and 120 cc. of ether was rapidly added to a mechanically stirred solution of 2.25 g. of lithium in 1500 cc. of liquid ammonia. 30 g. of ammonium chloride was added, the ammonia was allowed to evaporate, water was added to the residue and the product was extracted with methylene dichloride. The extract was washed with water, dried over sodium sulfate and evaporated to dryness. The residue was chromatographed on washed alumina, thus yielding 17α-ethinyl-19-nor-androstan-17β-ol-3-one, M.P. 222–223° C., [α]$_D$ +6° (chloroform).

Similarly, 19-nor-testosterone was converted into 19-nor-androstan-17β-ol-3-one; 17α-vinyl-19-nor-testosterone afforded 17α-vinyl-19-nor-androstan-17β-ol-3-one (M.P. 192–193° C., [α]$_D$ +47° (chloroform)), 17α-ethyl-19-nor-testosterone produced 17α-ethyl-19-nor-androstan-17β-ol-3-one (M.P. 212–214° C., [α]$_D$ +33° (chloroform)) and 17α-methyl-19-nor-testosterone gave 17α-methyl-19-nor-androstan-17β-ol-3-one.

470 mg. of 17α-ethinyl-19-nor-androstan-17β-ol-3-one was dissolved in 30 cc. of dioxane and treated with 300 mg. of sodium borohydride dissolved in 5 cc. of dioxane and the mixture was kept for 1 hour at room temperature. It was then acidified with acetic acid, diluted with water and extracted with chloroform. The extract was washed with water, dried over anhydrous sodium sulfate and evaporated to dryness. Crystallization from acetone produced the pure 17α-ethinyl-19-nor-androstane-3β,17β-diol, M.P. 192–193° C., [α]$_D$ −42° (chloroform).

Similarly, 19-nor-androstan-17β-ol-3-one was converted into 19-nor-androstane-3β,17β-diol (M.P. 168–170° C., [α]$_D$ +17° (chloroform)); 17α-vinyl-19-nor-androstan-17β-ol-3-one afforded 17α-vinyl-19-nor-androstane-3β,17β-diol (M.P. 167–169° C., [α]$_D$ +9° (chloroform)); 17α-ethyl-19-nor-androstan-17β-ol-3-one produced 17α-ethyl-19-nor-androstane-3β,17β-diol (M.P. 181–183° C., [α]$_D$ +2° (chloroform)); and 17α-methyl-19-nor-androstan-17β-ol-3-one gave 17α-methyl-19-nor-androstan-3β,17β-diol.

*Example II*

A mixture of 1 g. of 17α-ethyl-19-nor-androstane-3β,17β-diol, 20 cc. of pyridine and 1 cc. of acetic anhydride was allowed to react at room temperature for 12 hours and then poured into water. The mixture was heated for half an hour and cooled. The precipitate was collected and recrystallized several times from acetone, thus yielding the 3-acetate of 17α-ethyl-19-nor-androstane-3β,17β-diol.

By similar conventional esterification using the corresponding acid anhydride or halide there was produced the 3-propionate, butyrate, hemisuccinate, caproate, trimethylacetate, cyclopentylpropionate, benzoate, phenoxypropionate and β-chloropropionate.

The same esters were also prepared of the 17α-vinyl, ethinyl and methyl derivatives of Example I.

Reaction in a similar way give the corresponding 3,17-diesters of 19-nor-androstan-3β,17β-diol.

We claim:
1. 17α-vinyl-19-nor-androstan-3β,17β-diol.
2. The hydrocarbon carboxylic acid 3-monoesters of 17α-vinyl-19-nor-androstan-3β,17β-diol.
3. 17α-ethinyl-19-nor-androstan-3β,17β-diol.
4. The hydrocarbon carboxylic acid 3-monoesters of 17α-ethinyl-19-nor-androstan-3β,17β-diol.
5. 17α-vinyl-19-nor-androstan-17β-ol-3-one.

References Cited in the file of this patent

UNITED STATES PATENTS

| | | |
|---|---|---|
| 2,094,045 | Schoeller et al. | Sept. 28, 1937 |
| 2,662,089 | Murray et al. | Dec. 8, 1953 |
| 2,756,244 | Djerassi et al. | July 24, 1956 |
| 2,842,570 | Herr | July 8, 1958 |
| 2,861,087 | Herr | Nov. 18, 1958 |
| 2,881,191 | Herr | Apr. 7, 1959 |

OTHER REFERENCES

Fukushimia et al.: J. A. C. S., vol. 73, pages 196–201 (1951).

Patel et al.: J. Chem. Soc. (1952), pages 161.5.

Brooks et al.: Bio. Chem. J., vol. 54, pages 212–7 (1953).

Rapala et al.: J. Org. Chem., vol. 23, pages 1404–5 (1958).